United States Patent
Endress et al.

(10) Patent No.: US 9,617,003 B2
(45) Date of Patent: Apr. 11, 2017

(54) WEARABLE COTS USER DEVICES FOR AIRCRAFT CABIN-EOPERATIONS

(71) Applicant: Airbus Operations GmbH, Hamburg (DE)

(72) Inventors: Manfred Endress, Hamburg (DE); Holger Kuhlmann, Hamburg (DE); Kai Moeller, Hamburg (DE); Joern-Oliver Krumsieg, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/728,654

(22) Filed: Jun. 2, 2015

(65) Prior Publication Data

US 2015/0360781 A1 Dec. 17, 2015

(30) Foreign Application Priority Data

Jun. 13, 2014 (DE) .................. 10 2014 008 655

(51) Int. Cl.
*G06Q 10/00* (2012.01)
*B64D 11/00* (2006.01)

(52) U.S. Cl.
CPC ....... *B64D 11/00155* (2014.12); *G06Q 10/00* (2013.01)

(58) Field of Classification Search
CPC .................... B64D 11/00155; G06Q 10/00
USPC .......................................................... 701/2
See application file for complete search history.

(56) References Cited

U.S. PATENT DOCUMENTS

| | | | |
|---|---|---|---|
| 7,418,319 B2 | 8/2008 | Chen et al. | |
| 2007/0284474 A1* | 12/2007 | Olson | H04W 4/046 244/10 |
| 2009/0198392 A1 | 8/2009 | Eicke et al. | |
| 2009/0319902 A1* | 12/2009 | Kneller | G06F 3/013 715/733 |
| 2013/0248648 A1 | 9/2013 | Lesperance et al. | |
| 2014/0039717 A1 | 2/2014 | Henkel | |

FOREIGN PATENT DOCUMENTS

EP  2693406  2/2014

OTHER PUBLICATIONS

German Search Report, Jun. 13, 2014.

\* cited by examiner

*Primary Examiner* — Yazan Soofi
(74) *Attorney, Agent, or Firm* — Greer, Burns & Crain Ltd.

(57) ABSTRACT

A wearable device for operating one or more aircraft related systems, a device system comprising a plurality of such wearable devices, a system comprising such a wearable device and one or more aircraft related systems, and an aircraft comprising such a device system. The wearable device comprises: a user interface configured to receive a user input and to output information corresponding to the received user input; a system interface to connect the wearable device to the aircraft related systems; and a control unit configured to communicate with the aircraft related systems via the system interface to operate at least one of the aircraft related systems and to receive information from at least one of the aircraft related systems. The user interface is further configured to output the information received from the at least one of the aircraft related systems.

14 Claims, 2 Drawing Sheets

WEARABLE COTS USER DEVICES FOR AIRCRAFT CABIN-EOPERATIONS

CROSS-REFERENCES TO RELATED APPLICATIONS

This application claims the benefit of the German patent application No. 10 2014 008 655.0 filed on Jun. 13, 2014, the entire disclosures of which are incorporated herein by way of reference.

BACKGROUND OF THE INVENTION

The present disclosure generally relates to wearable devices. More specifically, the present disclosure relates to a wearable device for operating one or more aircraft related systems, a device system comprising a plurality of such wearable devices, a system comprising such a wearable device and one or more aircraft related systems, and an aircraft comprising such a device system.

Nowadays, in order to operate with onboard and off-board aircraft systems, Commercial Off The Shelf (COTS) mobile devices such as Notebooks, Tablets or Smartphones may be used. Further, in order to retrieve information from or input information into onboard aircraft systems, the cabin crew typically uses fixed devices on board an aircraft such as Flight Attendant Panels (FAPs).

For example, in EP 2 693 406 A2 and US 2014/0039717 A1, it is proposed to use at least one mobile recording device for recording items of multimedia information relating to a state of a component, for example, a component present on board a means of transport, and for transmitting the recorded items of multimedia information, relating to the state of the component, to a central logbook equipment. The central logbook equipment is configured to generate a multimedia logbook entry on the basis of the transmitted items of multimedia information, and to store the generated multimedia logbook entry.

During use of such mobile devices one or both hands of the user are occupied. Further, a pocket or other storage or attachment device is needed in order to carry such mobile device.

Accordingly, there is a demand for convenient techniques for communicating with aircraft related systems.

SUMMARY OF THE INVENTION

According to a first aspect, a wearable device for communicating with one or more aircraft related systems is provided. The wearable device comprises a user interface, a system interface and a control unit. The user interface is configured to receive a user input and to output information corresponding to the received user input. Via the system interface the wearable device is connectable to one or more aircraft related systems. The control unit is configured to communicate with the one or more aircraft related systems via the system interface to operate at least one of the one or more aircraft related systems and to receive information from at least one of the one or more aircraft related systems. The user interface is further configured to output the information received from the at least one of the one or more aircraft related systems.

In other words, the control unit is configured to communicate with the one or more aircraft related systems via the system interface (i) to operate at least one of the one or more aircraft related systems, or (ii) to receive information from at least one of the one or more aircraft related systems, or (iii) to operate at least one of the one or more aircraft related systems and to receive information from at least one of the one or more aircraft related systems.

The system interface may be realized as a hardware component integrated into the wearable device, such as, for example, as an interface card or other interface component installed in the wearable device. The system interface may use one or more interfaces that are delivered within a Commercial Off The Shelf (COTS) wearable device.

The one or more aircraft related systems may comprise any system typically arranged on board an aircraft, for example, any electronic or electrical system arranged on board an aircraft. Further, the one or more aircraft related systems may comprise any system that is arranged off-board an aircraft, but that provides information associated with the aircraft.

The wearable device is wearable by a user. In contrast to mobile devices such as smartphones, tablets or notebooks, the wearable device is not only portable such that it can be carried by a user, but it can be attached to the body of a user without additional elements such as a carrying bag or a hook and loop fastener.

The user interface may comprise an output component configured to output information such as information retrieved from at least one of the one or more aircraft related systems to which the wearable device is connected. The user interface may comprise an input component configured to receive the user input. For example, the user interface may be configured as or comprise a display as an output component, for example a display with additional input options such as a touch-sensitive display. On the display, retrieved or input information may be displayed. The display may, for example, be or comprise a display integrated in glasses. Alternatively or additionally, the display may, for example, be or comprise a flexible display integrated in clothing. Information may be input by means of a touch input. Alternatively or additionally, the user interface may be configured as or comprise a speech input unit such as a microphone in order to receive a user input. Alternatively or additionally, the user interface may be configured as or comprises a gesture input unit configured to receive a gesture input as a user input. Further, the user interface may be configured as or comprise a speech output unit such as a loudspeaker in order to output retrieved information.

The user interface of the wearable device may be configured to display status information of the one or more aircraft related systems. For example, the control unit of the wearable device may be configured to control the user interface to display such status information. The control unit may further be configured to generate one or more operating instructions and to forward the one or more operating instructions to the one or more aircraft related systems upon an input received via the user interface. The operating instruction may comprise one or more parameters defining specifics of the operation to be performed. An aircraft related system receiving an operating instruction from the wearable device may process the operating instruction and perform a corresponding operation in accordance with the operating instruction. The control unit may also be configured to receive status information communicated from the aircraft related system.

The control unit may be configured to generate one or more operating instructions. The control unit may be configured to operate the one or more aircraft related systems by means of the one or more operating instructions. For example, the user input as received via the user interface may relate to or comprise information, e.g., maintenance information, which is to be stored in an aircraft related system. Such user input may be input by any aircraft or airport personnel such as maintenance personnel. In accordance therewith, the control unit may generate one or more operating instructions related to the maintenance information, instructing the aircraft related system to store the maintenance information as received via the user interface.

The control unit may be configured to obtain information to be forwarded to at least one of the one or more aircraft related systems to which the wearable device is connected from the user interface of the wearable device. For example, the user interface may provide the control unit with a received user input, the control unit may generate an operating instruction corresponding to the received user input and the control unit may forward the operating instruction.

The control unit may be configured to control the one or more aircraft related systems by means of the one or more operating instructions. For example, the user input as received via the user interface may relate to or comprise control information, e.g., one or more control instructions. The control information may enable control of an aircraft related system to which the wearable device is connected via the system interface by means of the wearable device. In other words, the aircraft related system may be controlled by the wearable device. Such user input may be input by any aircraft personnel, airport personnel or passenger. Certain security functions may ensure that no security critical aircraft related systems may be accessed. In accordance therewith, the control unit may generate one or more operating instructions comprising control information, instructing the aircraft related system to perform certain functions in accordance with the control information as received via the user interface. For example, a passenger may access an entertainment system provided onboard the aircraft and may select certain functions, e.g., may start a movie, by means of the wearable device.

The communication between the wearable device and the one or more aircraft related systems may be or comprise one-directional or bi-directional communication. For example, the control unit may be configured to one-directionally communicate with the one or more aircraft related systems by transmitting data to the one or more aircraft related systems via the system interface. Alternatively, the control unit may be configured to one-directionally communicate with the one or more aircraft related systems by receiving data from the one or more aircraft related systems via the system interface. Alternatively, the control unit may be configured to bi-directionally communicate with the one or more aircraft related systems by transmitting data to and by receiving data from the one or more aircraft related systems via the system interface.

The communication between the wearable device and the one or more aircraft related systems may comprise wireless communication techniques. For example, Wireless Local Area Network (WLAN) techniques which are also sometimes referred to as Wi-Fi techniques and/or Bluetooth techniques may be used for wireless communication. Also any other suitable radio frequencies/wireless communication techniques or lightwaves may be used for communication.

The wearable device may comprise a device interface. Via the device interface the wearable device may be connectable to at least one of one or more other wearable devices and one or more mobile devices. The control unit may be configured to communicate with the at least one of the one or more other wearable devices and the one or more mobile devices via the device interface. The one or more other wearable devices may be configured in the same way as the wearable device described herein. The one or more mobile devices may be configured as or comprise a mobile or portable terminal such as a notebook, a tablet and/or a smartphone. In this way, the wearable device may allow communication between the wearable device and one or more other wearable devices or one or more mobile devices.

The control unit may be configured to forward information retrieved from at least one of the one or more aircraft related systems to which the wearable device is connected to a user interface of the wearable device. The user interface may output the information received from the control unit. Alternatively or additionally, the control unit may be configured to forward information retrieved from at least one of the one or more aircraft related systems to which the wearable device is connected to a memory unit of the wearable device. The memory unit may store the information received from the control unit. Alternatively or additionally, the control unit may be configured to forward information retrieved from at least one of the one or more aircraft related systems to which the wearable device is connected to a mobile device to which the wearable device is connected via a device interface. The mobile device may store and/or further process the information received from the control unit.

The control unit may be configured to obtain information to be forwarded to at least one of the one or more aircraft related systems to which the wearable device is connected from a memory unit of the wearable device. For example, the control unit may obtain a predefined operating instruction from the memory and may forward the operating instruction. Alternatively or additionally, the control unit may be configured to obtain information to be forwarded to at least one of the one or more aircraft related systems to which the wearable device is connected from a mobile device to which the wearable device is connected via a device interface. For example, the mobile device may provide the control unit with an operating instruction corresponding to a user input received at the mobile device and the control unit may forward the operating instruction. In this case, the user input is not input on the wearable device but on the mobile device connected thereto. Alternatively or additionally, the control unit may be configured to obtain information to be forwarded to at least one of the one or more aircraft related systems to which the wearable device is connected from another wearable device to which the wearable device is connected via a device interface. For example, said another wearable device may provide the control unit with an operating instruction corresponding to a user input received at said another wearable device and the control unit may forward the operating instruction. In this case, the user input is not input on the wearable device but on said another wearable device connected thereto.

The one or more aircraft related systems may comprise one or more onboard systems provided on board an aircraft. Alternatively or additionally, the one or more aircraft related systems may comprise one or more off-board systems provided on ground. The control unit may be configured to communicate with (i) the one or more onboard systems provided on board the aircraft via the system interface or (ii) the one or more off-board systems provided on ground (i.e., off-board the aircraft) via the system interface or (iii) with both the one or more onboard systems provided on board the aircraft and the one or more off-board systems provided on ground (i.e., off-board the aircraft) via the system interface.

The one or more onboard systems may comprise a cabin system (sometimes also referred to as cabin management system). The one or more onboard systems may comprise any number of network components or network devices such as sensors, actuators and the like.

The one or more onboard systems, e.g., a cabin system, may comprise a plurality of cabin components. Just to give examples for illustration rather than limitation, the cabin components may comprise or be configured as at least one of a passenger service unit, elements of a passenger service unit and a cabin illumination unit. Passenger service units may be arranged above the passenger seats and may provide passenger related functions to the passengers. For this purpose, passenger service units may comprise at least one of a fasten-seatbelt sign, a non-smoking sign, a flight attendant call button, a reading light and a loudspeaker. Cabin illumination units may be arranged in the cabin ceiling close to the overhead bins along the alleys of the cabin and may comprise, for example, LED strips or fluorescent light strips providing light to illuminate the cabin. A cabin component receiving an operating instruction from the control unit may process the operating instruction and perform an operation in accordance with the operating instruction. For example, a passenger service unit may receive an operating instruction to turn on the fasten-seatbelt sign and a cabin illumination unit may receive an operating instruction to reduce its brightness and generate a dimmed ambient light. Likewise, the control unit may retrieve information from a cabin component. For example, if a flight attendant call button is activated, the corresponding passenger service unit may forward information to the control unit informing the control unit that a certain flight attendant call button has been activated. The corresponding information may be output, e.g., displayed, on the user interface to inform the flight attendant wearing the wearable device.

The one or more onboard systems may comprise a Flight-Attendant Panel (FAP) provided onboard an aircraft. In this case, the control unit may be configured to communicate with the FAP. Alternatively or additionally, the one or more onboard systems may comprise a Cabin Intercommunication Data System (CIDS) provided onboard an aircraft. In this case, the control unit may be configured to communicate with the CIDS. The one or more onboard systems may comprise an entertainment system provided on board the aircraft.

The one or more aircraft related systems may comprise a maintenance system provided onboard or off-board the aircraft. The control unit may be configured to receive maintenance information from the maintenance system provided onboard the aircraft and/or the maintenance system provided off-board the aircraft. The maintenance information may comprise information indicating a state of a component or device provided on board an aircraft. The maintenance information may indicate which component or device requires maintenance. Further, the control unit may be configured to forward maintenance information to an onboard system and/or an off-board system. The maintenance information may comprise information indicating a state of a component or device provided on board an aircraft. The maintenance information may indicate which component or device requires maintenance.

The one or more aircraft related systems may comprise a connectivity system provided onboard an aircraft. An aircraft connectivity system may provide Internet Protocol (IP) based connectivity, for example via a connected ground network, towards the public Internet. Any client connected onboard through a wired or wireless connection (for example, Wireless Local Area Network (WLAN) technology may be used) can send and retrieve IP based data through the connected ground network with any IP based ground server connected to the Internet. The ground network may be connected via satellites (e.g., aircraft satcom system) or wireless equipped Airport Gatelink systems. Such wireless Airport Gatelink systems are standardized in Aeronautical Radio, Incorporated (ARINC) 763/822, for example. Alternatively or additionally, the one or more aircraft related systems may comprise an information system provided onboard the aircraft.

Alternatively or additionally, the one or more aircraft related systems may comprise an aircraft system providing aircraft avionic data. In this way, a user may retrieve avionic data from the aircraft avionic system and may display the retrieved avionic data on the user interface of the wearable device.

For example, a user interested in the location of the aircraft or other avionic data such as velocity or altitude of the aircraft, may input a user input via the user interface requesting such avionic data from the avionic system. The requested avionic data may then be forwarded to the control unit via the system interface and may then be output on the user interface.

Summarizing the above, for sake of explanation rather than limitation, the control unit may be configured to forward the operating instructions to at least one of an FAP provided on board the aircraft, a CIDS provided on board an aircraft, a maintenance system provided on board or off-board an aircraft, a connectivity system provided onboard or off-board an aircraft, an information system provided onboard or off-board an aircraft, and an aircraft system, provided onboard or off-board an aircraft, providing aircraft avionic data.

The one or more off-board systems may comprise an airline system such as a check-in system of an airline.

The wearable device may comprise an attachment unit configured to be attached to a body of a user. The attachment unit may be an integrated part of the wearable device. The wearable device may be attached to the body of a user via the attachment unit. The wearable device as described herein may comprise or may be configured as a head-mounted device such as glasses. Alternatively or additionally, the wearable device may comprise or may be configured as a wrist-attachable device such as a wristwatch.

According to a second aspect, a device system is provided. The device system comprises a plurality of wearable devices as described herein. At least a subset of the wearable devices may be interconnected with each other.

The device system may further comprise a plurality of mobile devices. At least a subset of the wearable devices may be connected to at least a subset of the mobile devices via a data connection, e.g., a wireless data connection. At least a subset of the wearable devices and the mobile devices may be configured to be used in parallel and simultaneously with each other.

According to a third aspect, a system comprising a wearable device as described herein and one or more aircraft related systems as described herein is provided. In accordance therewith, the control unit may be configured to operate the one or more aircraft related systems by means of the one or more operating instructions.

According to a fourth aspect, an aircraft comprising a device system as described herein may be provided.

According to a fifth aspect, a computer program may be provided. The computer program may be stored on the wearable device. For example, the computer program may be stored in the control unit or a memory unit of the control unit. The computer program comprises program code portions for carrying out one or more of the aspects described herein, when the computer program is run or executed on the wearable device such as a microprocessor, a microcontroller or a digital signal processor (DSP) of the wearable device.

Even if some of the above aspects are described herein with respect to data wearable device, the device system or the aircraft, these aspects may also be implemented as a method or as a computer program for performing or executing the method. Likewise, aspects described as or with reference to a method may be realized by suitable units (even if not explicitly mentioned) in the wearable device, the device system or the aircraft or by means of the computer program. All of the above described aspects may be implemented by hardware circuitry and/or by software.

BRIEF DESCRIPTION OF THE DRAWINGS

In the following, the present disclosure will further be described with reference to an exemplary embodiment illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, the skilled person will appreciate that the present disclosure may be practiced with other aircraft related information different from the specific examples discussed below to illustrate the present disclosure. Even if in the below the present disclosure is described only with respect to specific aircraft related systems, the disclosure may equally be practiced with other aircraft related systems. Further, even if in the below the present disclosure is described only with respect to two aircraft related systems, the disclosure may equally be practiced in any other environment having a different number of aircraft related systems.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the present disclosure is described as a method, it may also be embodied in a device (i.e., the wearable device described below or device system), a computer processor and a memory coupled to a processor, wherein the memory is encoded with one or more programs that perform the methods disclosed herein when executed by the processor.

Figure 1:
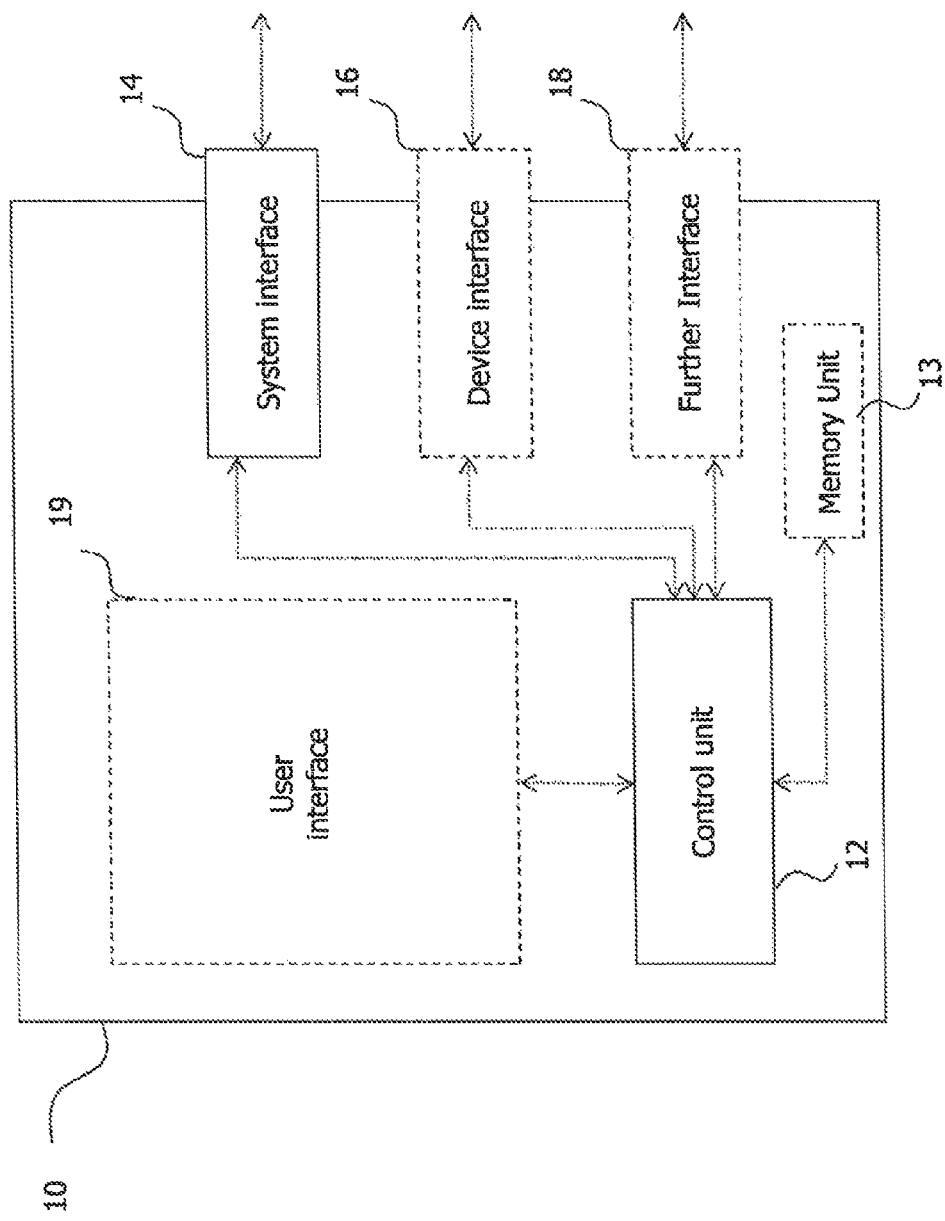
FIG. 1 schematically illustrates a device embodiment of a wearable device that is connectable to aircraft related systems.

FIG. 1 schematically illustrates a device embodiment of a wearable device 10 that is wearable by a user and connectable to aircraft related systems. The wearable device 10 comprises a control unit 12 and a system interface 14. Via the system interface 14 the wearable device 10 is connectable to one or more aircraft related systems in order to operate the one or more aircraft related systems.

Figure 2:
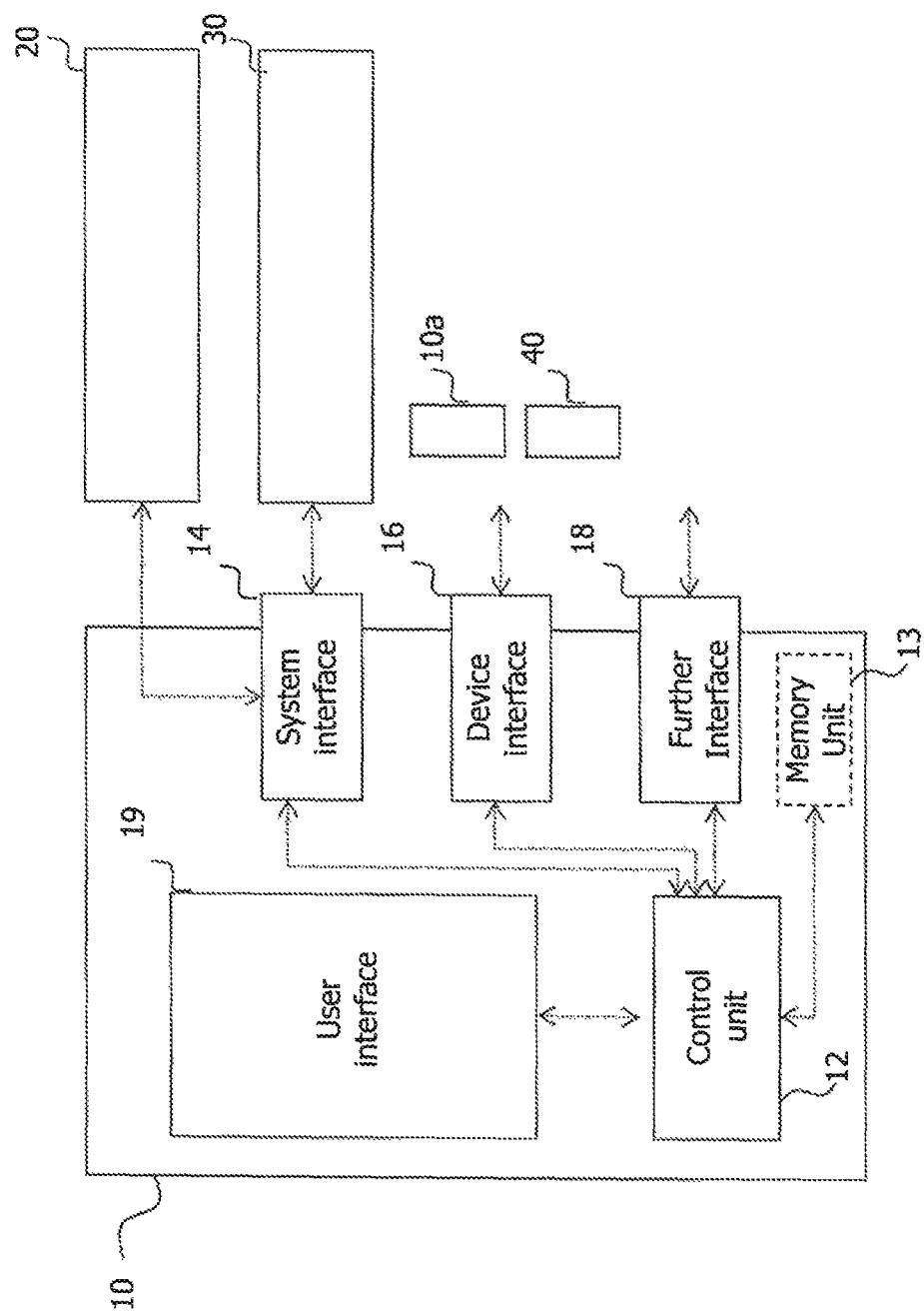
FIG. 2 schematically illustrates the device embodiment of the wearable device of FIG. 1 connected with aircraft related systems and devices to form a device system.

Referring to FIG. 2, for sake of explanation rather than limitation, an onboard system 20 provided on board an aircraft is shown as an example of an aircraft related system. Further, for sake of explanation rather than limitation, an airline system 30 provided on ground is shown as another example of an aircraft related system. The system interface 14 may connect the wearable device 10 to the onboard system 20 and the airline system 30 independently from each other or in parallel to each other via or wired or wireless data connection. In other words, the system interface 14 may connect the wearable device 10, via a wired or wireless data connection, with (i) only the onboard system 20 or (ii) only the airline system 30 or (iii) both the onboard system 20 and the airline system 30.

By way of example, the control unit 12 is configured to operate the onboard system 20 and the airline system 30 via the system interface 14. However, it may equally be possible that the control unit 12 is configured to operate the onboard system 20 only during a certain time period or the airline system 30 only during a certain time period via the system interface 14. For example, when the aircraft is in the air, the control unit 12 may only operate the onboard system 20. When the aircraft is on ground, the control unit 12 may operate the onboard system 20 and/or the airline system 30.

Returning to FIG. 1, the wearable device 10 may further comprise a memory unit 13, a device interface 16, a further interface 18 (in order to provide an interface for possible further usage) and a user interface 19.

Via the device interface 16 the wearable device 10 is connectable to at least one of one or more other wearable devices 10a and one or more mobile devices 40, one of each is shown by way of example in FIG. 2. The control unit 12 is configured to communicate with the other wearable device 10a and the mobile device 40 via the device interface 16. In FIG. 2, only one other wearable device 10a and one mobile device 40 are shown by way of example. However, the wearable device 10 may communicate with any number of other wearable devices 10a and/or mobile devices 40.

A user may input an input via the user interface 19. In the present example, the user interface 19 comprises a touch-sensitive display unit and a speech input/output unit. The display part of the touch-sensitive display unit functions as an output unit and the touch-sensitive part of the touch-sensitive display unit functions as an input unit. Likewise, a loudspeaker part of the speech input/output unit functions as an output unit and a microphone part of the speech input/output unit functions as an input unit. Although not explicitly shown in the figure, gesture techniques may be used for inputting a user input. For example, a gesture input unit may be provided to receive a gesture input of a user. In response to the input received via the user interface 19, the control unit 12 may generate corresponding operating instructions and may communicate the generated operating instructions to the onboard system 20 and/or the airline system 30.

The onboard system 20 may comprise or be configured as a cabin management system, for example a Cabin Intercommunication Data System (CIDS) as typically employed in Airbus aircrafts, like the A380, or any other Aircraft Information System. The cabin management system, e.g., CIDS, may be connected to the wearable device 10. The wearable device 10 provides a remote user interface to the cabin management system and may be operated by aircraft personnel to control and monitor various cabin functions in combination with cabin management system. Status information of cabin components of the CIDS may be displayed on the user interface 19 of the wearable device 10 and a flight attendant desiring to control one or more of the cabin components may use the wearable device 10 to correspondingly control the respective cabin components by inputting a corresponding input on the user interface 19 of the wearable device.

In accordance with a first example, the onboard system 20 may comprise an entertainment system provided on board the aircraft. A passenger wearing the wearable device 10 may access the entertainment system in order to select certain functions. For example, the passenger may select a movie provided by the entertainment system via the user interface 19 of the wearable device 10. Certain security functions may ensure that no security critical aircraft related systems can be accessed by the passenger's wearable device 10.

In accordance with a second example, the onboard system 20 may comprise an aircraft avionic system provided onboard the aircraft. A passenger wearing the wearable device 10 may access the avionic system in order to select retrieval of certain avionic data. For example, the passenger may select avionic data such as data about the altitude or velocity of the aircraft as provided by the avionic system via the user interface 19 of the wearable device 10. The avionic data may then be retrieved in accordance with the command of the user and may then be displayed on the user interface 19.

In accordance with a third example, the airline system 30 may comprise a maintenance system. The control unit 12 may be configured to receive maintenance information from the maintenance system. The maintenance information may comprise information indicating a state of a component or device provided on board an aircraft. The maintenance information may indicate which component or device requires maintenance. Further, the control unit 12 may be configured to forward maintenance information to the maintenance system. The maintenance information may comprise information indicating a state of a component or device provided on board an aircraft. The maintenance information may indicate which component or device requires maintenance. For example, maintenance personnel wearing the wearable device 10 may acquire information about the state of a component or device provided on board the aircraft and may forward the acquired information as maintenance information to the maintenance system. Further, the maintenance personnel may input via the user interface 19 that the maintenance information is to be stored in the maintenance system. The control unit 12 may generate operating instructions instructing the maintenance system to store the maintenance information. Likewise, the maintenance personnel may retrieve maintenance information from the maintenance system in accordance with the operating instructions received via the user interface 19. The retrieved information may then be output on the user interface 19. In this way, the maintenance personnel may compare the retrieved information with a component or device on board an aircraft. For example, damage of a component or device may be determined by way of this comparison.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wearable device for communicating with one or more aircraft related systems, the wearable device comprising:
   a user interface configured to receive a user input and to output information corresponding to the received user input;
   a system interface via which the wearable device is connectable to one or more aircraft related systems; and
   a control unit configured to communicate with the one or more aircraft related systems via the system interface to operate at least one of the one or more aircraft related systems and to receive information from at least one of the one or more aircraft related systems,
   wherein the user interface is further configured to output the information received from the at least one of the one or more aircraft related systems,
   wherein the one or more aircraft related systems comprise at least one of one or more onboard systems provided onboard an aircraft or one or more off-board systems provided on the ground,
   wherein, when the aircraft is in the air, the control unit operates the one or more onboard systems and the one or more off-board systems and the wearable device and each of at least one of one or more other wearable devices are located onboard the aircraft, and
   wherein the control unit operates the one or more onboard systems or the one or more off-board systems when the aircraft is on the ground.

2. The wearable device of claim 1, wherein the control unit is configured to generate one or more operating instructions corresponding to the received user input and to control the one or more aircraft related systems by means of the one or more operating instructions.

3. The wearable device of claim 1, wherein the wearable device comprises a device interface via which the wearable device is connectable to the at least one of one or more other wearable devices and one or more mobile devices, wherein the control unit is configured to communicate with the at least one of the one or more other wearable devices and the one or more mobile devices via the device interface.

4. The wearable device of claim 1, wherein the control unit is configured to at least one of:
   forward information retrieved from at least one of the one or more aircraft related systems to which the wearable device is connected to at least one of a user interface of the wearable device, a memory unit of the wearable device, and a mobile device to which the wearable device is connected via a device interface; and
   obtain information to be forwarded to at least one of the one or more aircraft related systems to which the wearable device is connected from at least one of a memory unit of the wearable device, from another wearable device to which the wearable device is connected via a device interface, and from a mobile device to which the wearable device is connected via a device interface.

5. The wearable device of claim 1, wherein the wearable device comprises an attachment unit configured to be attached to a body of a user.

6. The wearable device of claim 1, wherein the wearable device comprises or is configured as a head-mounted device such as glasses or a wrist attachable device such as a wristwatch.

7. The wearable device of claim 1, wherein the control unit is configured to communicate with at least one of:
- a Flight-Attendant Panel provided on board the aircraft,
- a Cabin Intercommunication Data System provided on board an aircraft, and a maintenance system provided on board or off-board an aircraft,
- a connectivity system provided onboard or off-board an aircraft,
- an information system provided onboard or off-board an aircraft, and
- an aircraft system providing aircraft avionic data.

8. A device system comprising a plurality of wearable devices for communicating with one or more aircraft related systems, each wearable device comprising:
- a user interface configured to receive a user input and to output information corresponding to the received user input;
- a system interface via which the wearable device is connectable to one or more aircraft related systems; and
- a control unit configured to communicate with the one or more aircraft related systems via the system interface to operate at least one of the one or more aircraft related systems and to receive information from at least one of the one or more aircraft related systems,
- wherein the user interface is further configured to output the information received from the at least one of the one or more aircraft related systems,
- wherein the one or more aircraft related systems comprise at least one of one or more onboard systems provided onboard an aircraft or one or more off-board systems provided on the ground,
- wherein, when the aircraft is in the air, the control unit operates the one or more onboard systems and the one or more off-board systems and the wearable device and each of at least one of one or more other wearable devices are located onboard the aircraft, and
- wherein the control unit operates the one or more onboard systems and the one or more off-board systems when the aircraft is on the ground.

9. The device system of claim 8, wherein at least a subset of the wearable devices is interconnected with each other.

10. The device system of claim 8, wherein the device system comprises a plurality of mobile devices, wherein at least a subset of the wearable devices is connected to at least a subset of the mobile devices via a data connection.

11. The device system of claim 10, wherein at least a subset of the wearable devices and the mobile devices is configured to be used in parallel and simultaneously with each other.

12. The device system of claim 8, wherein the device system is incorporated into an airplane.

13. A system comprising:
- one or more aircraft related systems and
- a wearable device for communicating with the one or more aircraft related systems, the wearable device comprising:
  - a user interface configured to receive a user input and to output information corresponding to the received user input;
  - a system interface via which the wearable device is connectable to one or more aircraft related systems; and
  - a control unit configured to communicate with the one or more aircraft related systems via the system interface to operate at least one of the one or more aircraft related systems and to receive information from at least one of the one or more aircraft related systems,
  - wherein the user interface is further configured to output the information received from the at least one of the one or more aircraft related systems,
- wherein the one or more aircraft related systems comprise at least one of one or more onboard systems provided onboard an aircraft or one or more off-board systems provided on the ground,
- wherein, when the aircraft is in the air, the control unit operates the one or more onboard systems and the one or more off-board systems and the wearable device and each of at least one of one or more other wearable devices are located onboard the aircraft, and
- wherein the control unit operates the one or more on board systems and the one or more off-board systems when the aircraft is on the ground.

14. The system of claim 12, wherein the system is incorporated into an airplane.

* * * * *